US012438433B2

(12) United States Patent
Heide et al.

(10) Patent No.: US 12,438,433 B2
(45) Date of Patent: Oct. 7, 2025

(54) MEDICAL PUMP DRIVE, PUMP AND MEDICAL TREATMENT APPARATUS

(71) Applicant: Fresenius Medical Care Deutschland GmbH, Bad Homburg (DE)

(72) Inventors: Alexander Heide, Eppstein (DE); Arne Peters, Bad Homburg (DE); Dejan Nikolic, Bad Soden (DE); Juergen Klewinghaus, Oberursel (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 1106 days.

(21) Appl. No.: 16/651,915

(22) PCT Filed: Sep. 26, 2018

(86) PCT No.: PCT/EP2018/076074
§ 371 (c)(1),
(2) Date: Mar. 27, 2020

(87) PCT Pub. No.: WO2019/063593
PCT Pub. Date: Apr. 4, 2019

(65) Prior Publication Data
US 2020/0306433 A1    Oct. 1, 2020

(30) Foreign Application Priority Data
Sep. 29, 2017    (DE) .......................... 102017122804.7

(51) Int. Cl.
*F04D 13/06*    (2006.01)
*A61M 1/34*    (2006.01)
(Continued)

(52) U.S. Cl.
CPC ............. *H02K 49/106* (2013.01); *A61M 1/34* (2013.01); *A61M 1/3413* (2013.01);
(Continued)

(58) Field of Classification Search
CPC ........ A61M 1/14; A61M 1/34; A61M 1/3413; A61M 2205/12; A61M 2205/3317;
(Continued)

(56) References Cited

U.S. PATENT DOCUMENTS 4,643,641 A * 2/1987 Clausen .............. A61M 60/232
  415/174.3
4,806,080 A * 2/1989 Mizobuchi ............ F16C 33/043
  384/123

(Continued)

FOREIGN PATENT DOCUMENTS

CN    101800464 A  *  8/2010    .............. G01M 3/00
CN    101917930        12/2010
(Continued)

OTHER PUBLICATIONS

Understanding LED indicator status lights and information, "Bose" (Year: 2011).*

(Continued)

*Primary Examiner* — Mark A Laurenzi
*Assistant Examiner* — Benjamin Doyle
(74) *Attorney, Agent, or Firm* — Fish & Richardson P.C.

(57) ABSTRACT

The present disclosure relates to a medical pump drive comprising a pump housing and a pump motor provided in the pump housing. The pump drive also includes a rechargeable voltage source for storing electrical energy, or a rechargeable battery, for a voltage supply of the pump motor and a magnetic section for magnetically coupling of further pump sections, and/or for magnetically driving of elements, in particular a magnetically driven pump rotor. The pump also includes an electronic controller. The disclosure further relates to a pump, an induction charging station, a tube set, and a blood treatment apparatus.

21 Claims, 4 Drawing Sheets

(51) Int. Cl.

| | |
|---|---|
| *A61M 39/10* | (2006.01) |
| *A61M 60/419* | (2021.01) |
| *H02J 7/00* | (2006.01) |
| *H02J 7/02* | (2016.01) |
| *H02J 50/10* | (2016.01) |
| *H02K 7/14* | (2006.01) |
| *H02K 11/20* | (2016.01) |
| *H02K 11/33* | (2016.01) |
| *H02K 49/10* | (2006.01) |

(52) U.S. Cl.
CPC .......... *A61M 39/10* (2013.01); *A61M 60/419* (2021.01); *F04D 13/068* (2013.01); *H02J 7/0044* (2013.01); *H02J 7/02* (2013.01); *H02K 7/14* (2013.01); *H02K 11/20* (2016.01); *H02K 11/33* (2016.01); *A61M 2205/3317* (2013.01); *A61M 2205/3584* (2013.01); *A61M 2205/50* (2013.01); *A61M 2205/587* (2013.01); *A61M 2205/8206* (2013.01); *A61M 2205/8243* (2013.01); *H02J 50/10* (2016.02)

(58) Field of Classification Search
CPC ...... A61M 2205/3584; A61M 2205/50; A61M 2205/587; A61M 2205/8206; A61M 2205/8243; A61M 2209/086; A61M 39/10; A61M 60/419; F04D 13/068; H02J 2310/23; H02J 50/10; H02J 7/0044; H02J 7/02
See application file for complete search history.

(56) References Cited

U.S. PATENT DOCUMENTS

| | | | | |
|---|---|---|---|---|
| 4,816,151 A * | 3/1989 | Schoendorfer | ......... | F16J 15/50 210/541 |
| 5,219,276 A * | 6/1993 | Metzner | ............... | F04C 15/008 417/423.7 |
| 5,945,762 A * | 8/1999 | Chen | ................... | A61N 1/3787 310/46 |
| 6,071,093 A * | 6/2000 | Hart | ................... | A61M 60/816 417/424.2 |
| 6,155,969 A * | 12/2000 | Schima | ............... | A61M 60/113 600/16 |
| 6,623,475 B1 * | 9/2003 | Siess | .................. | F04D 13/026 417/420 |
| 7,972,122 B2 * | 7/2011 | LaRose | ............... | A61M 60/825 417/423.5 |
| 8,279,091 B1 * | 10/2012 | Tran | ........................ | G06F 3/017 341/20 |
| 10,377,097 B2 * | 8/2019 | Canatella | ............. | A61M 60/489 |
| 2002/0161274 A1 * | 10/2002 | French | ................ | A61M 60/237 600/16 |
| 2005/0075696 A1 * | 4/2005 | Forsberg | .................. | H02J 50/12 607/61 |
| 2007/0229250 A1 * | 10/2007 | Recker | ................... | H05B 47/19 340/691.3 |
| 2008/0255795 A1 * | 10/2008 | Shkolnikov | ........... | G06F 1/1684 701/532 |
| 2009/0069784 A1 * | 3/2009 | Estes | ................. | A61M 5/16804 604/67 |
| 2009/0069787 A1 * | 3/2009 | Estes | ....................... | G16H 40/67 604/151 |
| 2010/0247335 A1 * | 9/2010 | Atherton | ................. | F04D 13/08 702/141 |
| 2011/0110794 A1 * | 5/2011 | Mayleben | ........... | F04D 15/0218 417/313 |
| 2011/0238005 A1 | 9/2011 | Miyazaki et al. | | |
| 2011/0260968 A1 * | 10/2011 | Ye | ........................ | G06F 3/0346 345/158 |
| 2012/0150259 A1 | 6/2012 | Meskens | | |
| 2012/0211093 A1 * | 8/2012 | Grimes | .................... | F04B 53/08 417/313 |
| 2012/0274564 A1 * | 11/2012 | Cronjaeger | ........... | G06F 1/3259 713/323 |
| 2013/0301845 A1 | 11/2013 | Royal | | |
| 2014/0066690 A1 * | 3/2014 | Siebenhaar | ......... | A61M 60/585 600/16 |
| 2014/0067056 A1 * | 3/2014 | Schimpf | ............. | A61M 60/538 324/207.2 |
| 2014/0246025 A1 * | 9/2014 | Cragg | ............... | A61M 16/0866 128/204.19 |
| 2015/0025499 A1 * | 1/2015 | Trock | ................ | A61M 5/16831 604/152 |
| 2015/0199485 A1 * | 7/2015 | Borges | ................... | G16H 40/40 600/323 |
| 2015/0275902 A1 * | 10/2015 | Patey | .................. | F04D 27/0292 415/118 |
| 2015/0317909 A1 * | 11/2015 | Florkoski | ................. | G09B 5/00 434/270 |
| 2015/0367049 A1 | 12/2015 | Chen et al. | | |
| 2016/0084069 A1 * | 3/2016 | Camacho Cardenas | ..................... | F04D 29/445 415/118 |
| 2017/0157309 A1 * | 6/2017 | Begg | ..................... | F04D 29/048 |
| 2017/0201945 A1 | 7/2017 | Chae et al. | | |
| 2017/0226998 A1 * | 8/2017 | Zhang | ..................... | F04B 17/03 |
| 2017/0363103 A1 * | 12/2017 | Canatella | .............. | F04D 13/027 |
| 2017/0373517 A1 | 12/2017 | Johanski et al. | | |
| 2018/0032730 A1 * | 2/2018 | Miller | .................... | G06F 21/565 |
| 2018/0238924 A1 * | 8/2018 | Wang | ...................... | F04B 49/06 |
| 2018/0250458 A1 * | 9/2018 | Petersen | ............. | A61M 60/422 |
| 2018/0294050 A1 * | 10/2018 | Seufert | .................. | G16H 40/63 |
| 2018/0320943 A1 * | 11/2018 | Schumacher | ....... | F04D 15/0254 |

FOREIGN PATENT DOCUMENTS

| | | |
|---|---|---|
| CN | 102247625 | 11/2011 |
| CN | 103585683 | 2/2014 |
| CN | 204016533 | 12/2014 |
| CN | 104271175 | 1/2015 |
| CN | 105529754 | 4/2016 |
| CN | 106334224 | 1/2017 |
| CN | 106421939 | 2/2017 |
| CN | 106537800 | 3/2017 |
| CN | 107112773 | 8/2017 |
| DE | 69628097 | 3/2004 |
| DE | 102013007190 | 10/2014 |
| DE | 102017116142 | 1/2019 |
| EP | 1293224 | 3/2003 |
| EP | 2616117 | 7/2013 |
| EP | 2674624 | 12/2013 |
| JP | 2014-500097 | 1/2014 |
| JP | 2014-514036 | 6/2014 |
| JP | 2015-510431 | 4/2015 |
| JP | 2016-116948 | 6/2016 |
| TW | 404842 | 9/2000 |
| TW | 01518924 * | 5/2015 |
| WO | WO 99/17819 | 4/1999 |
| WO | WO 2009/046996 | 4/2009 |
| WO | WO 2012/034569 | 3/2012 |
| WO | WO 2012/035040 | 3/2012 |
| WO | WO 2012/077088 | 6/2012 |
| WO | WO 2012/112664 | 8/2012 |
| WO | WO 2012/126800 | 9/2012 |
| WO | WO 2013/122580 | 8/2013 |
| WO | WO 2014/198005 | 12/2014 |
| WO | WO 2015098709 * | 7/2015 |

OTHER PUBLICATIONS

Wikipedia.com [online] "Drahtlose Energieübertragung", Sep. 3, 2017, Retrieved from the Internet on Jul. 5, 2018, 7 pages.

International Preliminary Report on Patentability in Application No. PCT/EP2018/076074, dated Mar. 31, 2020, 8 pages (English translation).

(56) References Cited

OTHER PUBLICATIONS

International Search Report and Written Opinion in Application No. PCT/EP2018/076074, dated Jan. 25, 2019, 9 pages (English translation).

* cited by examiner

MEDICAL PUMP DRIVE, PUMP AND MEDICAL TREATMENT APPARATUS

CROSS-REFERENCE TO RELATED APPLICATIONS

The present application is the national stage entry of International Patent Application No. PCT/EP2018/076074, filed on Sep. 26, 2018, and claims priority to Application No. DE 10 2017 122 804.7, filed in the Federal Republic of Germany on Sep. 29, 2017, the disclosure of which are express incorporated herein in entirety by reference thereto.

TECHNICAL FIELD

The present disclosure relates to a medical pump drive, a pump, an induction charging station and a set. It further encompasses a tube set, a medical treatment apparatus (in short also: treatment apparatus), moreover a method for charging a rechargeable battery and a method for assembling two sections of the pump.

BACKGROUND

In operation of an extracorporeal blood treatment, blood is withdrawn from the patient and extracorporeally led along a blood circuit or a tube set and—in the example of dialysis treatment—through a blood filter. The blood filter comprises a blood chamber through which blood is fed, and a dialysis liquid chamber, through which dialysis liquid is led. Both chambers are separated from each other by a semi-permeable membrane. Blood and dialysis liquid are mostly guided through the blood filter by the counter-current principle. The blood is cleaned in the blood filter. On exiting the blood filter, the dialysis liquid, from now on referred to as dialysate, is regarded as used and is discarded. In addition to the dialysate, the fluid to be discarded also comprises filtrate, which comprises water which has been withdrawn from the blood in the blood filter. Filtrate and dialysate will be referred to individually or collectively in the following simply as effluent.

The effluent is led to an effluent bag via an effluent inlet line and is first stored there. After completion of the blood treatment, or in bag emptying intervals during the blood treatment (intervals in which the bag is emptied), the effluent is discarded from the effluent bag into a sink or a basin over which said bag is held.

SUMMARY

The present disclosure relates to a medical pump drive which comprises at least a housing and a pump motor provided in the housing. The pump drive further comprises a rechargeable voltage source for storing electrical energy, or a rechargeable battery. They serve to supply voltage to the pump motor.

Furthermore, the pump drive is designed with a magnetic section, e.g., designed as coils with iron core. This is used for the magnetically coupling and/or magnetically driving of components, in particular components of a magnetically driven pump rotor. The drive is preferably contactless.

Finally, the pump drive comprises a control electronics for the controlling or closed/open loop controlling thereof.

All components of the pump drive, in particular the components mentioned above, may optionally all together be included or integrated in the housing. In several embodiments, they may thus share the housing. In some embodiments, the pump drive has exactly one housing which separates its components from an exterior of the pump drive.

The present disclosure further relates to a pump. It comprises a pump drive and at least one pump section which in turn comprises a pump rotor. The pump section having the pump rotor is preferably part of a tube set and/or of a disposable.

The present disclosure further relates to an induction charging station for charging the rechargeable battery of the pump drive. The induction charging station optionally possesses control electronics which are configured to detect the positioning of the pump drive on the induction charging station and to charge the rechargeable battery.

The present disclosure relates to a set. The set encompasses at least a pump drive and/or a pump. Further, the set comprises an induction charging station and/or an external device.

The induction charging station and/or the external device is configured such that it is in signal communication with the control electronics of the pump drive via a wireless module in order to be able to receive and display signals, states, functions and/or settings of the control electronics and/or of the rechargeable battery.

The induction charging station may be, or may comprise, a platform or a base surface for the pump drive.

The present disclosure relates to a tube set, in particular a medical tube set, which comprises at least one pump section having a pump rotor. The pump section is provided to be operatively connected to or brought together with a pump drive, in particular a pump drive. The pump section and optionally all other sections of the tube set do not comprise any device(s) for connecting the pump section to the pump drive, except for an optional magnetic connection and/or the use of gravity.

The present disclosure relates to a treatment apparatus which comprises, or is connected to, a pump, a tube set and/or a set. The treatment apparatus may be a blood treatment apparatus. Alternatively, it may be used elsewhere in patient care than in blood treatment. It may be used for analysis, therapy, diagnosis or treatment.

If the treatment apparatus is embodied as a blood treatment apparatus, it may thus comprise a blood pump. During the treatment of the patient, the blood pump conveys blood through sections of the extracorporeal blood circuit and towards the blood filter or dialyzer. The blood is led away from the blood filter or dialyzer and is returned to the patient through sections of the extracorporeal blood circuit. A venous blood chamber and a bubble trap as well as pressure sensors may be part of the extracorporeal blood circuit and/or of the blood treatment apparatus.

The present disclosure relates to a method to charge the rechargeable battery of the pump drive. Said method encompasses rotating or orienting the pump drive (e.g., in the hand, in the air, etc.) such that the end with which the induction charging coil is associated points downward. The method further encompasses positioning or mounting the pump drive, oriented this way, on a base surface of an induction charging station, in particular an induction charging station, in a motion that comprises at least also a top-down direction.

The present disclosure relates to a method for bringing together a pump drive with a pump section comprising a pump rotor through an optional rotation or orientation of the pump drive (e.g., in the hand, in the air, etc.) such that the end comprising the magnetic section, or associated therewith, therein points downward. The method further encompasses positioning or mounting the pump drive oriented this way on a pump section comprising a pump rotor in a motion that comprises at least also a top-down direction. This method results in a complete and/or functioning pump.

Assembling may be understood as joining the pump drive and the pump section or placing the pump drive on the pump section such that together they result in the functioning pump.

Embodiments may comprise some, several, or all of the features mentioned herein in any combination unless the person skilled in the art recognizes the specific combination as technically impossible.

In all of the following implementations, the use of the expression "may be" or "may have" and so on, is to be understood synonymously with "preferably is" or "preferably has," and so on, respectively, and is intended to illustrate embodiments.

Whenever numerical words are mentioned herein, the person skilled in the art shall recognize or understand them as indications of numerical lower limits. Unless it leads the person skilled in the art to an evident contradiction, the person skilled in the art shall comprehend the specification, for example, of "one" encompassing "at least one". This understanding is also equally encompassed by the present disclosure as the interpretation that a numerical word, for example, "one" may alternatively mean "exactly one", wherever this is evidently technically possible for the person skilled in the art. Both are encompassed and apply herein to all used numerical words.

Whenever an embodiment is mentioned herein, it is then an exemplary embodiment.

Whenever "programmed" or "configured" is mentioned herein, it is thus disclosed that these terms are interchangeable.

Whenever a spatial indication such as "top" or "bottom" is mentioned herein, the person skilled in the art understands it as the arrangement in the accompanying figures and/or in the use state. "Bottom" is closer to the center of the earth or to the bottom edge of the figure than "top".

A method step described herein also encompasses a corresponding programming or configuration of a suitable device or a section thereof.

In several embodiments, the pump consists of pump drive and pump section which in turn is connected to tubes. These tubes may be comprised by the pump. In some embodiments, they are not comprised by the pump.

In some embodiments, the pump drive comprises an induction charging coil for charging the voltage source or the rechargeable battery.

In several embodiments, the housing comprises a base section for placing the pump drive on a base surface.

In some embodiments, the housing comprises a connecting section for, in particular functionally, connecting the pump drive to a pump section containing a pump rotor. The connecting section may hereby be a cavity, one or several openings, one or several blind openings or the like. The latter may, preferably exclusively, serve for receiving a protrusion of the pump section, for example by simple inserting or plugging of the protrusion into the connecting section. The connecting section may, therefore, be an inserting section.

In several embodiments, the base section and the connecting section lie at opposite ends of the housing or are associated therewith.

In some embodiments, the pump drive comprises at least one, in particular colored, lighting device. This may be designed as a ring, in particular as an LED or LED color ring.

The lighting device may be positioned in particular in or at the housing.

In several embodiments, the control electronics of the pump drive are configured with, or connected to, a wireless module.

In several embodiments, the control electronics are designed, programmed and/or configured to send signals, which are, or may be, received by one or several external devices, if necessary at the same time, and to display or inform about the functions and/or settings of the control electronics or the states or functions of the pump or of the rechargeable battery.

In several embodiments, the external device is a smartphone or another handset or mobile device.

A wireless module may be a computer hardware which makes it possible to connect a computer or control electronics to a wireless network (WLAN) via an interface (e.g., PCI, USB, PCMCIA, PC Card).

In some embodiments, the control electronics are configured with, or connected to, at least one motion sensor. This motion sensor may be integrated or connected in order to enable the accordingly programmed control electronics to determine the position or the movement direction by it.

In some embodiments, the control electronics are configured to signal the ongoing battery charging state or to display the actual charging process with one or more colors, e.g., as a change of colors from red to yellow to green.

In several embodiments, the control electronics are configured to display the charging state of the rechargeable battery qualitatively or quantitatively, e.g., as "full", "empty", in percentage like e.g., "90%", "ready for use", "not ready for use" etc. This information may be performed on an external device e.g., per display and/or per transmission via wireless module.

In some embodiments, the control electronics are configured to switch off the lighting device when or after the complete charging or when or after a predetermined level of charging of the voltage source or of the rechargeable battery is achieved.

In some embodiments, the control electronics are configured to change from a first state of the control electronics or of the pump drive into a second state upon detecting a movement of the pump drive via the motion sensor.

The first state may be a sleep mode, an inactive mode and/or a state of a lower power consumption (compared to the energy consumption or the average power consumption in the second state). In the first state, the bearing current for driving a magnetic bearing, for example for the magnetic section of the pump drive, may be zero.

The second state may be an active mode, an awake mode and/or a state of higher power consumption (compared to the power consumption or average power consumption in the first state). In the second state, the magnetic bearing, for example of the magnetic section of the pump drive, may be supplied with voltage and consume power.

Detecting a movement of the pump drive via the motion sensor may be directed at detecting the movement of the pump drive in space.

Therefore, the motion sensor or the subsequent control electronics may be designed and/or configured to indicate that the pump drive has been moved, such as by being taken from the induction charging station or from another place and held in hand.

At the same time, it may optionally be detected by the motion sensor that the pump drive has been removed from the induction charging station, rotated and has been placed upside down on the pump section having the pump rotor in a movement that comprises a top-down direction. This may be understood as an indication of the pending use of the pump drive as part of the pump and may optionally automatically cause or effect a transition from the first state to the second state.

A top-down motion direction of the pump drive may be—as optionally also other motions—stored as a motion sequence. The pump may be configured to start pumping upon detecting this movement—e.g., at the end of the stored motion sequence. This motion sequence as well as others may be stored in a reference database.

Other functions associated with actual movements of the pump drive may also be stored and started, stopped, executed, etc. by the control electronics upon detection of the actual movement.

Also, predetermined or specific movements which are similar to gestures which take place while the user is having the pump drive in his hand and which may be registered by the motion sensor, are encompassed in their implementation by the present invention. The control electronics may be configured accordingly to recognize or identify each of the movements mentioned herein as well as for further movements.

In several embodiments, the charging state in the second state is indicated by the lighting device.

In several embodiments, detecting a motion is indicated in the second state.

In several embodiments, the lighting device emits in the first state another light than in the second state.

In some embodiments, the pump consists of a pump drive, wherein the control electronics are configured to, in particular upon detecting a movement of the pump drive via the motion sensor, activate the magnetic section of the pump drive and/or to supply it with bearing voltage or bearing current or, optionally, to change into the second state and to supply the pump drive and/or the magnetic section with voltage or current.

In some embodiments, the control electronics of the pump drive are configured to display the charging state via the lighting device.

In several embodiments, the control electronics are configured to display the charging state only if the control electronics have detected a movement of the pump drive via the motion sensor.

In several embodiments, the control electronics are configured, in particular upon detecting a pump section having a pump rotor or upon detecting a pump rotor, e.g., via a hall sensor, to rotate the magnetic section of the pump drive, e.g., in the second state, in particular to a predetermined speed, in particular while displaying the proceeding rotation via the lighting device, e.g., in blue, e.g., by circulating light emission.

In several embodiments, the control electronics are configured to detect a movement of the pump drive via a, in particular low-power, motion sensor and to change into a second or active state.

In some embodiments, the control electronics of the pump drive are configured to reduce the maximum or the preset speed, in particular upon detecting a drying up, decreasing or dried up liquid flow, which flows through the pump. Preferably, the speed is reduced such that a balance is established between the liquid pumped via the pump on the one hand and the liquid which flows into the pump due to gravity or other reasons on the other hand.

In several embodiments, the control electronics are configured to detect drying up, decreasing or dried up liquid flows by a sensor and/or based on changes of the driving or bearing currents. The currents of the power supply which are required or retrieved from magnetic bearings or from the magnetic drive for generating the bearing force and rotation through controlled electromagnets are referred to as bearing currents.

An advantage may be that there is no need for a check valve to prevent liquid from flowing through the pump against a proper pumping direction, i.e., in a direction from the outlet to the inlet of the pump.

In several embodiments, the control electronics of the pump drive are configured to transmit a notification of movement of the pump drive to an exterior device.

In several embodiments, the preferred electrical rating is between 25 and 40 watts (W), in particular between 30 and 35 W, most preferably 32 W.

In several embodiments, the drive voltage of the electric drive of the pump is 24 (volt) V.

In some embodiments, the pump section comprises a device for releasably fixing the pump section to a housing section or to another section of a treatment apparatus, in particular blood treatment apparatus, in particular in the foot area of this device.

In several embodiments, the device for releasably fixing the pump section, is, or comprises, a clamp device or a latching or clip device.

In several embodiments, the device for releasably fixing the pump section, which is optionally a clamp device or a latching or clip device, has a curved course or profile.

The curved course may have the shape of a semi-channel curved along its length.

In some embodiments, the pump has no device for connecting the pump drive to the pump section comprising a pump rotor, except for an optional magnetic connection and/or the use of gravity due to which the pump drive lies on the pump section.

In several embodiments, the pump drive, the pump section and/or another component of the pump comprises in any case no mechanical connecting device for connecting the pump drive to the pump section, except for the base surface of the pump section on which the pump drive is placed in order to obtain the functioning pump.

A connecting device for connecting pump drive and pump section may be a clip connection, a snap-in connection, a screwed connection or another form fit and/or force fit connection. In some embodiments, a connecting device may not only be a cavity or an opening for the insertion of a protrusion. In some embodiments, a connecting device is not the connecting section mentioned herein. In several embodiments, the connecting section comprises no movable elements for holding or retaining the pump drive on the pump section, such as for example a latching tongue, an elastic click or clip section, a screw section or the like and/or thereto corresponding structures like a latching lug, a threaded section, a click or clip counter section or the like for receiving or retaining the first-mentioned structures.

An advantage may be that the pump drive can simply be pulled off or lifted off at any time (even during the pumping process). This may be done with one hand, in particular when no mechanical connecting devices have to be opened beforehand, since these devices are not provided in theses embodiments.

In some embodiments, the pump section with its liquid inlet or fluid inlet is connected to a tube section which leads from an effluent bag to the pump.

In several embodiments, the pump section with its liquid outlet or fluid outlet is connected to a tube section which leads to an outlet, drain sink or basin for discarding the effluent.

In some embodiments, the pump rotor has a magnetic bearing and/or is magnetically driven. This type of magnetic bearing or driving may serve to protect the patient from an electric shock.

The magnetic section of the pump rotor may be a permanent magnet.

In some embodiments, the pump rotor is an impeller pump head.

In several embodiments, the pump drive is not a fixed part of a treatment apparatus, in particular a blood treatment apparatus. Nevertheless, it may be releasably connectable or connected to the treatment apparatus, preferably without cable connection and/or signal conductor connection to the treatment apparatus.

In some embodiments, operating the pump drive is manually started and/or stopped.

In some embodiments the blood treatment apparatus is designed as a hemodialysis apparatus, hemofiltration apparatus or hemodiafiltration apparatus, in particular as an apparatus for chronic renal replacement therapy or for the continuous renal replacement therapy (CRRT).

In several embodiments, the treatment apparatus comprises the induction charging station for the rechargeable battery of the pump drive of the pump. The rechargeable battery may be a low voltage source or low current source.

In some embodiments, the storage capacity of the rechargeable battery of the pump drive is between 800 mAh and 1800 mAh, preferably between 1000 mAh and 1500 mAh, most preferably approximately or exactly 1100 mAh.

In some embodiments, the fluid inlet of the pump section is in fluid communication with an effluent bag via a tube.

In several embodiments, the control or closed-loop control device of the treatment apparatus for switching the switching device is not configured or programmed such that the effluent bag is sometimes connected to the effluent inlet line and sometimes to the effluent outlet line.

In several embodiments, the control electronics of the treatment apparatus are configured to automatically start or stop the pump upon a respective signal indicating the switching of a switching device e.g., a multi-way valve device, which is integrated into the tube set with the effluent outlet line.

In addition to the herein disclosed medical pump drive, a pump drive which comprises any combination of features disclosed herein for the medical pump drive is proposed by the present disclosure. However, in these embodiments, the pump drive is not a medical pump drive which is used for e.g., patient care, cell therapy or the like, but it is provided for its use outside the field of medicine or the conveyance of medical fluids. Such fields may encompass bioprocessing, the production of cosmetics, paper or food, drug manufacturing, and others. Such fields may also include mechanical engineering, in particular the field of household or kitchen appliances. This also applies to the pump assembled using the pump drive.

In addition to the disclosed medical treatment apparatus, an apparatus which comprises any combination of features herein disclosed for the medical treatment apparatus is provided.

However, in these embodiments, the apparatus is not a medical treatment apparatus which is used for e.g., patient care, cell therapy or the like, but it is provided for its use outside the field of medicine or the conveyance of medical fluids. Such fields may encompass bioprocessing, the production of cosmetics, paper, or food, drug manufacturing, and others. Such fields may also include mechanical engineering, in particular the field of household or kitchen appliances.

Further, a monitoring device is also disclosed herein, having at least one location indication sensor (e.g., GPS) and/or motion sensor, which comprises any combination of features of the motion sensor disclosed herein. In these embodiments, the motion sensor is not part of the pump drive, but it may be part of any other device which may serve for monitoring.

Such a monitoring device may be releasably connected or connectable to any device, such as a treatment apparatus like an apparatus for cell treatment, disinfection, rinsing, parenteral nutrition and the like, in particular a blood treatment apparatus, more particularly a hemodialysis apparatus, hemofiltration apparatus or a hemodiafiltration apparatus, in particular an apparatus for chronic renal replacement therapy or for continuous renal replacement therapy (CRRT).

In some embodiments, such monitoring device is not in signal communication with the controlling or closed/open loop controlling of the device connected to it. In particular there is no configuration required for this purpose.

In several embodiments, such monitoring device is in signal communication with at least one external device, as defined herein. The monitoring device and/or the external device are configured to inform the user, preferably automatically, about results concerning e.g., the treatment apparatus, the device which is monitored by the monitoring device. Such results may include device vibrations, collisions, its condition ("whether the device is standing still/stationary or in motion") its location ("where the device is located") and so on.

In several embodiments, such a monitoring device is releasably connected to the treatment apparatus. The connection may be established by magnet devices, clamp devices, holders, latching devices or the like. Devices corresponding thereto may be provided.

In some embodiments, the voltage source is provided within the housing of the pump drive.

In several embodiments, the pump is not a piston pump.

In some embodiments, the pump or the pump drive has no piston which is arranged in order to oscillate axially in the housing.

In several embodiments, the pump has no check valve.

In some embodiments, the pump drive is not designed to be perfused between a housing inlet and a housing outlet by the fluid pumped.

Some or all embodiments may include one, several or all of the aforementioned and/or following advantages.

The use of the pump driven by a rechargeable battery poses no danger to the patient resulting from the conduction of electricity. A further advantage may be that when using the pump or its control electronics, a check valve may be omitted. Further, it is advantageous that the pump may be provided to be manually assembled, but nevertheless subsequently follows a programming. Starting the pumping, adjusting the speed, and other steps, which are described herein, as well as further steps and functions may be carried out automatically. In addition, many embodiments do not require an intervention in the controlling or closed/open loop controlling of the treatment apparatus or a manual starting of the pump in order to empty the effluent bag. Additionally, unwanted movements of the treatment apparatus in the room may be displayed by the interaction of motion sensor, wireless module, and external device.

BRIEF DESCRIPTION OF THE FIGURES

In the following, the present invention is merely exemplarily described with reference to the accompanying figures. In the figures, same reference numerals designate same or identical components. Wherein.

DETAILED DESCRIPTION OF THE FIGURES

Figure 1:
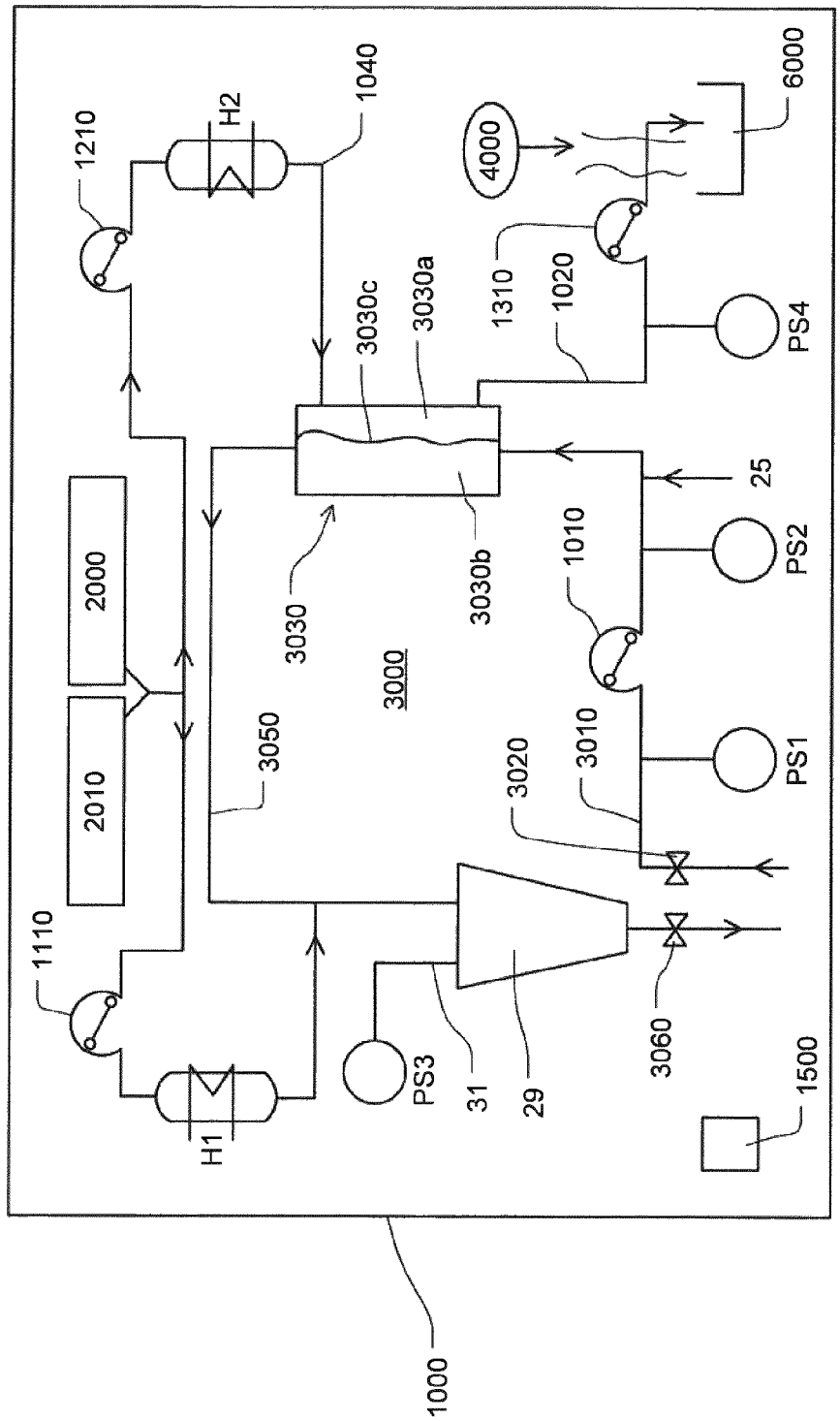
FIG. 1 shows a simplified illustration of a medical treatment apparatus, herein a blood treatment apparatus by way of example with an extracorporeal blood circuit in a first embodiment.
Figure 2:
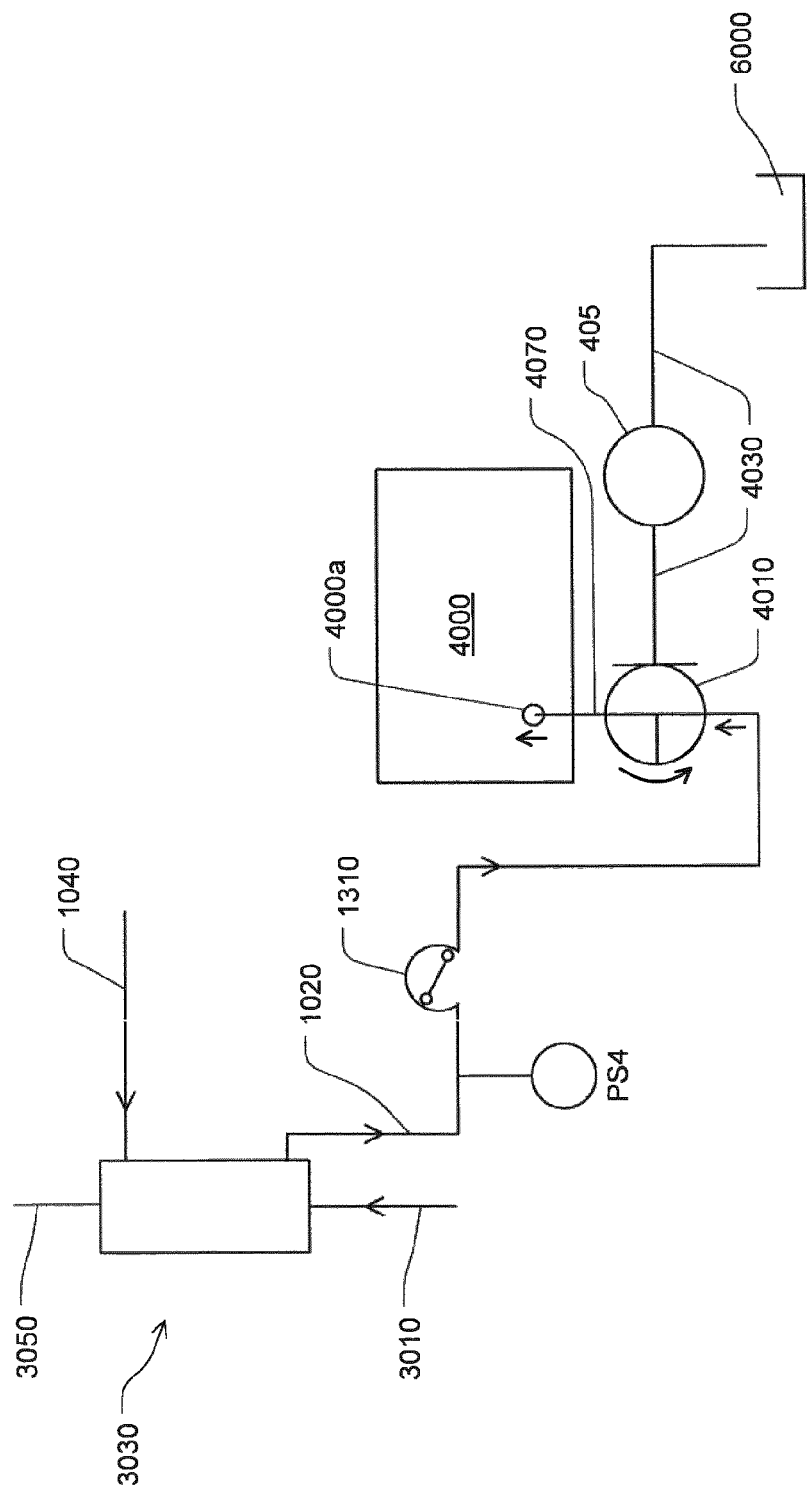
FIG. 2 shows a simplified illustration of a pump integrated in a discharge tube set of the blood treatment apparatus of FIG. 1.

FIG. 1 shows a highly simplified illustration of a blood treatment apparatus 1000 as an example of a medical treatment apparatus connected to an extracorporeal blood circuit 3000 as an example of a tube set and a roughly indicated discharge tube set with an effluent bag 4000. Discharge tube set and effluent bag 4000 are shown in FIG. 2. The blood treatment apparatus 1000 of FIG. 1 further comprises, or is connected to, a pump 405. This pump is, however, also only shown in the following figures.

The extracorporeal blood circuit 3000 comprises a first line 3010, here an arterial line section.

The first line 3010 is in fluid communication with a blood treatment device, here exemplarily a blood filter or dialyzer 3030. The blood filter 3030 comprises a dialysis liquid chamber 3030a and a blood chamber 3030b which are separated from each other by a semi-permeable membrane 3030c.

The extracorporeal blood circuit 3000 additionally comprises at least a second line 3050, here a venous line section. Both the first line 3010 and the second line 3050 may serve for the connection to the vascular system of the patient (not shown).

The first line 3010 is optionally connected to a (first) tube clamp 3020 for blocking or closing the first line 3010. The second line 3050 is optionally connected to a (second) tube clamp 3060 for blocking or closing the second line 3050.

In FIG. 1, the blood treatment apparatus 1000, which is schematically represented only by some of its devices, comprises a blood pump 1010. The blood pump 1010 conveys blood during the treatment of the patient through sections of the extracorporeal blood circuit 3000 and towards the blood filter or the dialyzer 3030. This is indicated by the small arrow tips, which in each of FIGS. 1 and 2 generally indicate the flow direction.

Fresh dialysis liquid is pumped from a source 2000 along the dialysis liquid inlet line 1040 into the dialysis liquid chamber 3030a using a blood pump 1210 for dialysis liquid which may be designed as a roller pump or as an otherwise occluding pump. The dialysis liquid leaves the dialysis liquid chamber 3030a as dialysate, possibly enriched by filtrate, towards the basin 6000 and is herein referred to as effluent.

The source 2000 may be, for example, a bag or a container. The source 2000 may also be a fluid line, from which online and/or continuously produced or mixed liquid is provided, e.g., a hydraulic outlet/connection of the blood treatment apparatus 1000.

A further source 2010 having substitute may be optionally provided. It may correspond to the source 2000 or be a separate source.

Indicated at the bottom right of FIG. 1 is where the discharge tube set having the effluent bag 4000 is connected to the blood treatment apparatus 1000.

The arrangement shown in FIG. 1 further comprises purely optionally, in addition to the aforementioned blood pump 1010, a series of further pumps, in each case optional, namely the pump 1110 for substitute, for conveying substitute, preferably through an optional bag heating H1, the pump 1210 for dialysis liquid and the pump 1310 for the effluent.

The pump 1210 is provided to supply dialysis liquid from a source 2000, for example a bag, via an optional existing bag heating with a bag H2, to the blood filter 3030, via a dialysis liquid inlet line 1040.

The dialysis liquid conveyed in this way exits again from the blood filter 3030 via the dialysate outlet line 1020, supported by the pump 1310, and may be discarded.

An optional arterial sensor PS1 is provided upstream of the blood pump 1010. It measures the pressure in the arterial line during a treatment of a patient.

A further optional pressure sensor PS2 is provided downstream of the blood pump 1010, but upstream of the blood filter 3030 and, if provided, upstream of an addition site 25 for heparin. It measures the pressure upstream of the blood filter 3030 ("pre-hemofilter").

Yet, a further pressure sensor may be provided as PS4 downstream of the blood filter 3030, however preferably upstream of the pump 1310 in the dialysate outlet line 1020, to measure the filter pressure of the blood filter 3030.

Blood, which leaves the blood filter 3030, passes through or perfuses an optional venous blood chamber 29, which may comprise a ventilation device 31 and may be in fluid communication with a further pressure sensor PS3.

A control or closed-loop device 1500 for controlling or regulating the blood treatment apparatus 1000 may be provided and may be in signal communication and/or control communication with all the aforementioned components of the blood treatment apparatus 1000.

FIG. 2 shows a simplified illustration of a discharge tube set having an effluent bag 4000, at the moment during which effluent is fed to the effluent bag 4000.

An optional switching device or three-way-tap 4010, herein exemplarily designed as a three-way-tap 4010, is arranged in the dialysate outlet line 1020 between the pump 1310 for the effluent and the effluent bag 4000, but anyhow upstream thereof. A connecting line 4070 may be provided between the switching device or three-way-tap 4010 and the effluent bag 4000. Dialysate (and/or effluent) leaves the blood filter 3030 through the dialysate outlet line 1020. It serves at the same time also as an effluent inlet line, since it feeds effluent to the effluent bag 4000.

As shown in FIG. 2, the three-way tap 4010, in its position shown in FIG. 2, fluidically connects the dialysate outlet line 1020 to the effluent inlet opening, which is also the effluent outlet opening, therefore in short: effluent opening 4000a, of the effluent bag 4000.

In this first position, the effluent outlet line 4030, which is also connected to the three-way tap 4010, is blocked or closed. The effluent outlet line 4030 is in turn directly or indirectly connected to the basin 6000.

The effluent outlet line 4030 may be part of a tube set.

In the first position shown in FIG. 2, the effluent from the dialysate outlet line 1020 may get to the effluent bag 4000 through the three-way-tap 4010, but not to the effluent outlet line 4030. The three-way-tap 4010, due to its design, may be made from electrically insulating material and/or in the places in which it is fluid conveying, it may effect an electrical insulation.

A pump 405 is integrated in the effluent outlet line 4030. The latter leads downstream of the pump 405 into the basin 6000.

The pump 405 is arranged downstream of the effluent bag 4000 but upstream of the basin 6000.

Figure 3:
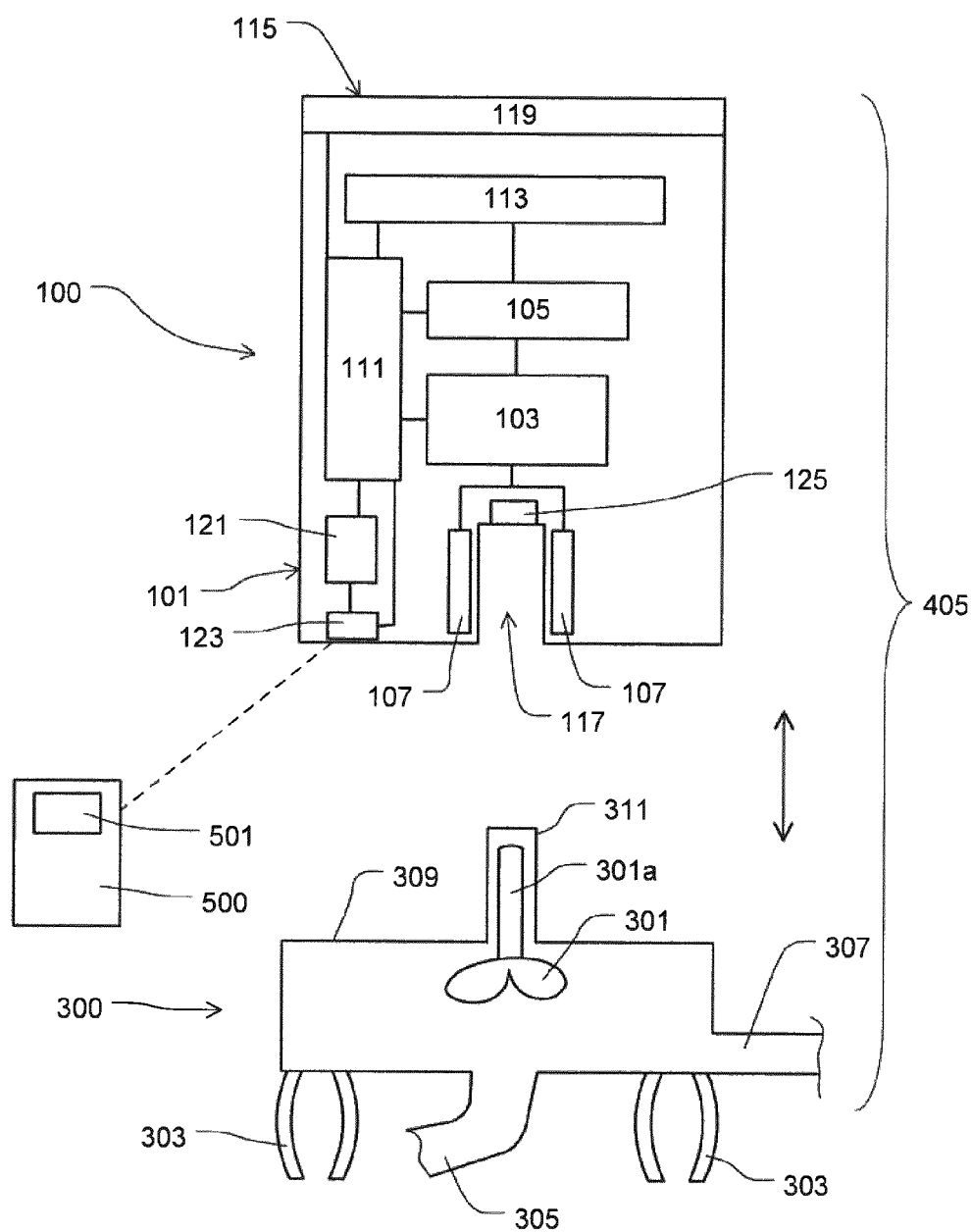
FIG. 3 shows a simplified illustration of a pump drive (top) and a pump section (bottom), which together form or build a pump, in a first embodiment being partially illustrated in section

The pump 405, which comprises at least one pump drive 100 as shown in FIG. 3, is not in operation ("OFF") it its position shown in FIG. 2, as there is no effluent present in the effluent outlet line 4030 which could be discarded via the pump 405 into the basin 6000.

FIG. 3 shows in a highly simplified illustration a medical pump drive 100 of the pump 405 shown in FIG. 2 having a pump housing 101. In the pump housing 101, there are housed, a pump motor 103, a rechargeable voltage source or a rechargeable battery 105, a magnetic section 107 for, in particular non-contact, driving of a pump rotor 301, a control device or closed-loop electronics (controller) 111 for controlling or regulating the charging of the battery as well as other functions of the pump drive 100 and an induction charging coil 113 for charging the battery 105 by induction. The pump housing 101 may be one piece or multi-piece.

The pump housing 101, which is here purely exemplarily of a cylindrical design, comprises at one of its ends or end sections (in FIG. 3 at the upper end of the pump housing 101) a base section 115 having an optionally flat surface. Using the base surface 115, the pump drive 100 (based on its illustration in FIG. 3) may be placed upside down, so to speak; a state shown in FIG. 4. For obvious reasons, the induction charging coil 113 is comparatively close to the base section 115, it optionally even contacts the latter.

The pump housing 101 further comprises a connecting section 117 which couples the pump housing 101 shown at the top of FIG. 3 with the pump section 300 shown at the bottom of FIG. 3.

In the embodiments shown herein and in further embodiments, connecting is to be understood as bringing together the pump drive 100 comprising the pump motor 103 for a pump rotor 301 and the pump section 300 comprising the pump rotor 301. Said connecting is herein therefore to be understood in such a manner that the bringing together results in a functioning pump 405.

Figure 4:
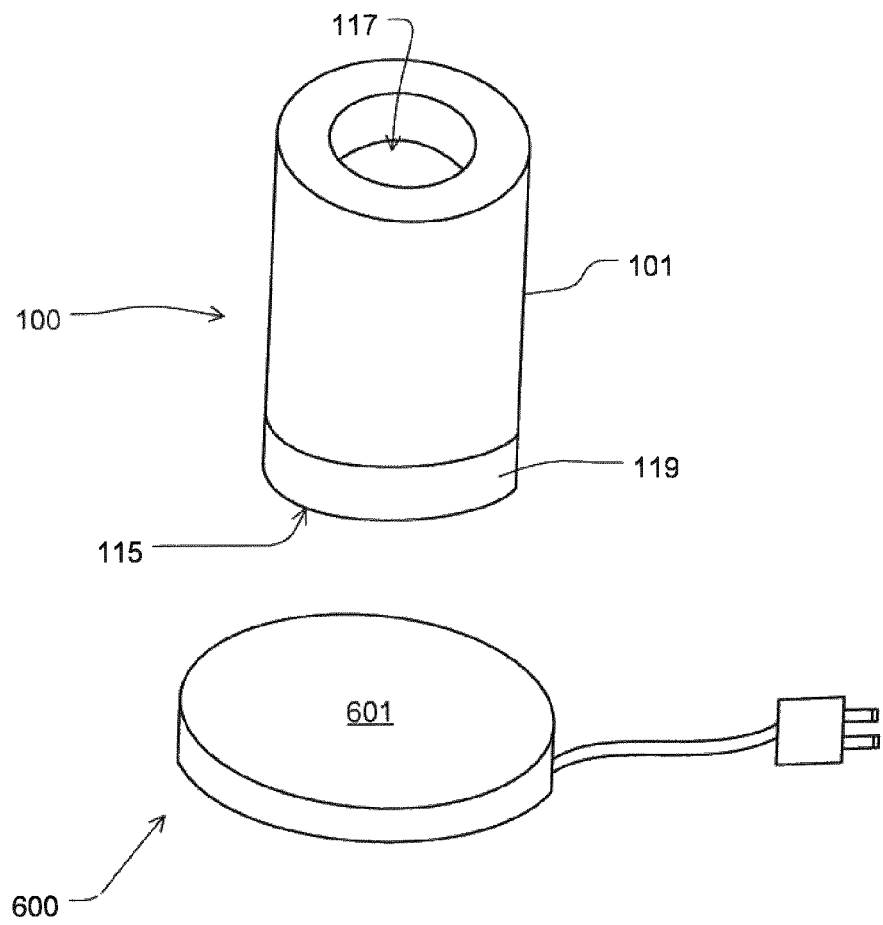
FIG. 4 shows a simplified illustration of the pump drive of FIG. 3 (top) with an induction charging station (bottom).

Said connecting encompasses in some embodiments, for example those shown in FIG. 3 and FIG. 4, no mechanical fixing of the pump housing 101 or of the pump drive 100 at the pump section 300.

Said connecting encompasses in some embodiments, including those in FIG. 3 or FIG. 4, no mechanical devices for holding the pump drive 100 at the pump section 300, in particular no claws, several of which may be distributed around the circumference. These embodiments encompass no, e.g., horizontal, plates or protrusions which would be received in other elements, e.g., claws or clamps which would serve for establishing a connection.

In the example in FIG. 3 and FIG. 4 as well as in further arbitrary embodiments, the pump drive 100 is held on the pump section 300 or on the induction charging platform (station) 600 by gravity, if necessary supported by magnetic attraction between pump drive 100 and pump section 300.

A lateral shifting or displacement of the pump drive 100 relative to the pump section 300, or vice versa, may be prevented in a simple manner in that the connecting section 117 is designed as a cavity or blind opening as in the example of FIG. 3, into which a protrusion (elevation) 311 of the pump section 300 may be inserted, in particular by a simple movement in the connecting direction, which is shown with a double arrow in FIG. 3, and in that no fastening precedes or follows, for example using a lever, by rotating the pump drive 100 relative to the pump section 300 for mutual locking of these two components, etc. Alternatively or additionally, anti-shift or anti-displacement devices may be provided, for example edges, interlockings, engagement pins, etc., which, respectively, preferably need no actuation and/or no handling of the user in order to be engaged.

As can be seen in the indicated sectional view of FIG. 3, the magnetic section 107 is rotatably mounted around the connecting section 117 within the pump housing 101.

As can further be seen in the sectional view of FIG. 3, the pump rotor 301 is rotatably mounted within the protrusion (elevation) 311.

The pump housing 101 further comprises at least one lighting device 119 which is visible from outside the pump housing 101. It may be controlled by the control electronics 111 in order to signal via light the states or functions of the pump drive 100, or of its components, to the user of the pump drive 100 or the pump 405.

The lighting device 119 may be a ring, in particular with one or several LEDs, or may be an LED colored ring.

Also for this purpose, the pump drive 100 may comprise a wireless module for data or signal transmission. Such a transmission may be carried out to an external device 500. Using a display 501 of the external device 500, information about the pump drive 100 or the pump 405 may be transmitted to the user, for example indicating the mode, the charging state of the battery, etc.

The pump drive 100 may optionally further comprise a motion sensor 123, which informs if or that the pump drive 100 has been moved. Such movement may cause the control electronics 111 to changeover from a first state (e.g., a low-power or energy-saving sleep mode) to a second state (e.g., an awake mode in which the light device 119 is activated, changed between modes or turned on).

The pump section 300 comprising the pump rotor 301, may comprise a device for the releasable fixing of the pump section 300 to a section of the blood treatment apparatus 1000, schematically illustrated in FIG. 1, or of another medical treatment apparatus.

The device for the releasable fixing may be a clip device 303 which is one piece or multi-piece.

The pump section 300 may be part of a disposable.

This disposable may further comprise tube sections of the effluent outlet line 4030, of which only a fluid inlet 305 and a fluid outlet 307—respectively their connectors—are exemplarily shown, with the aid of which liquid that needs to be pumped flows into a housing 309 of the pump section 300 or flows out of it.

FIG. 3 shows the pump drive 100 and the pump section 300 just before connecting them to the pump 405. When they are connected to the pump 405, they maintain their orientation or alignment in a use-position of the pump 405 to the extent that the connecting section 117 represents the lower end of the pump drive 100 and the elevation 311 represents the upper end of the pump section 300. In general terms, the pump drive 100 is placed from the top on the pump section 300 in order to be connected to a pump 405, not vice versa. Even during the use of the pump 405, the pump drive 100 is on top, the pump section 300 is on the bottom. After the use of the pump 405 is finished, the pump drive 100 is lifted upwards from the pump section 300.

In the following, a typical use of the pump drive 100 is explained.

When the pump drive 100 is removed for use from the induction charging station 600, which is not limited for to charging by induction but may alternatively use other methods, the (optionally low-power) motion sensor 123 detects activity and awakens the control electronics 111. As a result, the charging state of the battery 105 is optionally indicated by the lighting device 119, e.g., in a first color.

Alternatively or additionally, a movement which has been detected is indicated e.g., by a different color than the first one.

In order to assemble the pump 405 by placing the pump drive 100 on the pump section 300, the drive is horizontally rotated about 180°.

The pump drive cavity or the connecting section 117 now points downwards and may accordingly be placed on the elevation 311 of the pump section 300, which includes the pump rotor 301 and is oriented upwards.

The pump rotor 301 comprising a magnetic section 301a, which would normally fall downwardly into the interior of the pump section 300 if it were not for the effect and proximity of the pump drive 100, is pulled upwardly as the pump drive 100 approaches by its iron armatures (stators). It is possible for the user to notice that the pump drive 100 is accordingly pulled downwardly. The form-fitting parts apparently come together independently and in a very clearly defined position. They come in the operating position of the pump 405 in which it is ready-to-function.

The control electronics 111, already awakened by the initial movement of the pump drive 100 when it is lifted from the induction charging station 600, monitors and detects the magnetic section 301a inserted in the connecting section 117, which may be a housing cavity. This detection may be achieved e.g., by optional hall sensors 125 or by other devices and said detection effects an automatic start of a stored program: the magnetic section 301a comes into a floating state due to activating the position control and the magnetic section 301a is accelerated to a defined speed (drive active).

The liquid arranged in the effluent bag 4000 above the pump ensures that liquid is available in the pump head and that large quantities of liquid may be conveyed immediately. The lighting device 119, here the color ring, signals the pumping process with a (e.g., blue), optionally rotating color ring or circulating light.

A "color ring" as used herein may be a ring of individual light sources or illuminants, such as a series of adjacent LEDs.

When the pump 405 has drained or emptied the liquid reserve of the effluent bag 4000 and sucks in air or generates a negative pressure (e.g., with a collapsed suction line), the control electronics 111 detect a change in the driving/bearing currents. The drive currents result from the power required to maintain the speed. If the resistance of the liquid changes (e.g., due to air bubbles, negative pressure, density), the driving current must be adjusted in order to be able to keep the speed constant. This monitoring is used to initiate detecting an empty bag: the maximum or preset speed is reduced. It may be advantageous to choose a speed which is just sufficient to prevent the liquid from flowing back. Thus, a balance is established between the liquid pumped upwards and the liquid flowing downwards—due to gravity. By this measure, e.g., a check valve is redundant. This blocking function may again be indicated by a corresponding signal from the lighting device or color ring 119 (e.g., when a blue, rotating color ring (=pumping process) changes into a blue, pulsating color ring which indicates the blocking function which may have the function of a check valve).

After the pumping process, the pump drive 100 is rotated again about 180° and placed, with its induction coil 113 down, on the induction charging station 600. The charging process is displayed by an optional e.g., occasional light signal of the lighting device or the color ring 119. If the battery 105 is loaded to e.g., 100%, the pump drive 100 and its control electronics 111 return to the first state, e.g., the low power mode.

The wireless interface 121 may be configured to transmit e.g., via Bluetooth protocol.

The transmission may be carried out to e.g., a receiver of the blood treatment apparatus the display of which may make a corresponding notification, or which may effect another routine. The transmission may alternatively or additionally be carried out to an external device 500, such as e.g., a smartphone or other hand-held device or mobile device.

If the pump 405 and/or the induction charging station 600 is directly or frictionally connected to the blood treatment apparatus, it is possible to send the data of the motion sensor 123 via wireless interface 121 to the external device 500 and thus to the user. As a result, a movement warning of the blood treatment apparatus 1000 may be achieved without any intervention in the device electronics or software of the blood treatment apparatus 1000. In the case of scale-based devices, this would mean important information for the user, since the balancing system of the blood treatment apparatus 1000 triggers a corresponding error cascade due to or in case of vibrations. Therefore, the user has the possibility to check the blood treatment apparatus 1000, e.g., the dialysis machine, beforehand and to eventually eliminate, in time, easily correctable errors which are the cause of the vibration. Such causes include a collision of the blood treatment apparatus with another device, a pulsating tube which strikes against the blood treatment apparatus etc. It is here of particular advantage that a message may be given to the user which allows a fastest possible reaction, preferably before the machine automatically initiates action, for example because the balancing scales stop operating unnoticed due the vibrations. After evaluating the scale error, the balancing device may be switched off, for example by the user who is then aware of this.

FIG. 4 shows in its upper part a simplified illustration of the pump drive 100 in a slight perspective from the top. It shows in its bottom part an induction charging station 600.

To charge the battery 105 of the pump drive 100, the battery is placed on a base surface 601 of the induction charging station 600 from above with its end, to which the induction coil 113 (not shown in FIG. 4) is associated. In this, a horizontal or substantially horizontal placement or orientation of the induction charging station 600 or of its base surface 601 is required. In the position reached then, the battery is not further fixed or connected in the example of FIG. 4. It remains stable due to its weight on the base surface 601. However, holders or fasteners may be provided.

The aforementioned statements or explanations which are made in particular with reference to the figures and relate to a blood treatment apparatus, are not to be understood as being limited to a medical apparatus for the treatment of blood. Other medical apparatuses which do not treat blood, but nevertheless convey a medical fluid via a pump, are also fully encompassed by the above disclosure.

LIST OF REFERENCE NUMERALS 25 addition site for heparin (optional)
29 venous blood chamber
31 ventilation device
100 medical pump drive, also: pump drive
101 pump housing
103 pump motor
105 rechargeable voltage source or rechargeable battery
107 magnetic section
111 control or closed loop electronics
113 induction charging coil
115 base section or support section
117 connecting section
119 lighting device or color ring
121 wireless module or wireless interface
123 motion sensor
125 hall sensor
300 pump section
301 pump rotor
301a magnetic section
303 clip device
305 fluid inlet
307 fluid outlet
309 housing
311 protrusion
405 pump
500 external device
501 display
600 induction charging platform or induction charging station
601 base surface or support surface
1000 blood treatment apparatus
1010 blood pump
1020 dialysate outlet line, effluent inlet line
1040 dialysis liquid inlet line
1110 pump for substitute
1210 pump for dialysis liquid
1310 pump for dialysate or effluent
1500 control or closed-loop control device
2000 source with dialysis liquid
2010 source with substitute (optional)
3000 extracorporeal blood circuit
3010 first line (arterial line section)
3020 (first) tube clamp
3030 blood filter or dialyzer
3030a dialysis liquid chamber
3030b blood chamber
3030c semi-permeable membrane
3050 second line (venous line section)
3060 (second) tube clamp
4000 effluent bag
4000a effluent inlet/outlet opening; effluent opening
4010 three-way tap, switch unit
4030 effluent outlet line, tube set
4070 connecting line
6000 basin or sink
H2 bag heater with bag (dialysis liquid)
H1 bag heater with bag (substitute)
PS1, PS2 arterial pressure sensor (optional)
PS3 venous pressure sensor (optional)
PS4 pressure sensor for measuring the filtrate pressure

The invention claimed is:

1. A medical pump drive comprising:
a pump housing;
a pump motor arranged in the pump housing, the pump housing comprising:
a distal end comprising a base section for positioning the pump drive onto a base surface; and
a proximal end comprising a connecting section for connecting the pump drive to a pump section;
an induction charging coil situated in the distal end of the pump housing;
a rechargeable voltage source for storing electrical energy, or a rechargeable battery, for a power supply of the pump motor;
a magnetic section for magnetically coupling or magnetically driving components of a magnetically driven pump rotor; and
an electronic controller comprising or connected to a motion sensor, the motion sensor configured to detect movement of the pump drive, the movement comprising a rotation of the entire pump drive, wherein the electronic controller is configured to determine an orientation of the pump drive,
wherein the electronic controller is configured to activate the magnetic section of the pump drive to transfer the pump drive from a first state to a second state in response to determining that the pump drive is in a first orientation, wherein the magnetic section is configured to magnetically couple or magnetically drive the components of the magnetically driven pump rotor when the magnetic section is activated in the second state, and wherein the electronic controller is configured to deactivate the magnetic section of the pump drive to transfer the pump drive from the second state to the first state in response to determining that the pump drive is in a second orientation, wherein the magnetic section is configured to stop magnetically coupling or magnetically driving the components of the magnetically driven pump rotor when the magnetic section is deactivated in the first state.

2. The pump drive according to claim 1, wherein the induction charging coil is configured to charge the rechargeable voltage source or the rechargeable battery.

3. The pump drive according to claim 1, further comprising a colored lighting device, wherein the colored lighting device is a part of or arranged at the pump housing.

4. The pump drive according to claim 3, wherein the colored lighting device comprises an LED colored ring.

5. The pump drive according to claim 3, wherein the electronic controller is configured to signal an ongoing charging progress with one or more colors of the color lighting device.

6. The pump drive according to claim 3, wherein the electronic controller is configured to switch off the colored lighting device when or after a charging of the rechargeable voltage source or the rechargeable battery is complete.

7. The pump drive according to claim 1, wherein the electronic controller comprises or is connected to a wireless module.

8. The pump drive according to claim 1, wherein the electronic controller is configured to display a charging state of the rechargeable voltage source or the rechargeable battery via a lighting device.

9. The pump drive according to claim 1, wherein the electronic controller is configured to rotate the magnetic section of the pump drive when the motion sensor or a Hall sensor detects placement of the pump drive on a pump section having the magnetically driven pump rotor.

10. The pump drive according to claim 9, wherein the electronic controller is configured to rotate the magnetic section of the pump drive at a predetermined speed.

11. The pump drive according to claim 9, wherein the electronic controller is configured to display a current or actual rotation via a lighting device.

12. The pump drive according to claim 1, wherein the electronic controller is configured to change to an active state in response to the motion sensor detecting the movement of the pump drive.

13. The pump drive according to claim 1, wherein the electronic controller is configured to reduce a maximum pump speed or a preset pump speed to a pump speed which establishes a balance between a liquid pumped out of a pump and the liquid which flows into the pump upon detecting decreasing liquid flow through the pump.

14. The pump drive according to claim 1, wherein the electronic controller is configured to transmit a notification about the movement of the pump drive to an external device.

15. A pump comprising:
a pump drive comprising:
a pump housing, the pump housing comprising:
a distal end comprising a base section for positioning the pump drive onto a base surface; and
a proximal end comprising a connecting section for connecting the pump drive to a pump section;
an induction charging coil situated in the distal end of the pump housing;
a pump motor arranged in the pump housing;
a rechargeable voltage source for storing electrical energy, or a rechargeable battery, for a power supply of the pump motor;
a magnetic section for magnetically coupling or magnetically driving components of a magnetically driven pump rotor; and
an electronic controller comprising or connected to a motion sensor, the motion sensor configured to detect movement of the pump, the movement comprising a rotation of the entire pump drive, wherein the electronic controller is configured to determine an orientation of the pump drive; and
at least one pump section comprising the magnetically driven pump rotor, wherein the pump section is part of at least one of a tube set and a disposable element,
wherein the electronic controller is configured to activate the magnetic section of the pump drive to transfer the pump drive from a first state to a second state in response to determining that the pump drive is in a first orientation, wherein the magnetic section is configured to magnetically couple or magnetically drive the components of the magnetically driven pump rotor when the magnetic section is activated in the second state, and wherein the electronic controller is configured to deactivate the magnetic section of the pump drive to transfer the pump drive from the second state to the first state in response to determining that the pump drive is in a second orientation, wherein the magnetic section is configured to stop magnetically coupling or magnetically driving the components of the magnetically driven pump rotor when the magnetic section is deactivated in the first state.

16. The pump according to claim 15, wherein the at least one pump section comprises a device configured to releasably fix the at least one pump section to a housing section of a blood treatment apparatus or to a foot area of another section of the blood treatment apparatus.

17. The pump according to claim 16, wherein the device is, or comprises, a latching or clip device.

18. The pump according to claim 15, further comprising a magnet connection configured to connect the pump drive to the at least one pump section.

19. A medical treatment apparatus comprising or connected to at least one of:
a pump;
a set comprising an induction charging station; and
a tube set,
wherein the at least one of the pump, the set, and the tube set comprises:
a pump drive comprising:
a pump housing, the pump housing comprising:
a distal end comprising a base section for positioning the pump drive onto a base surface; and
a proximal end comprising a connecting section for connecting the pump drive to a pump section;
an induction charging coil situated in the distal end of the pump housing,
a pump motor arranged in the pump housing,
a rechargeable voltage source for storing electrical energy, or a rechargeable battery, for a power supply of the pump motor,
a magnetic section for magnetically coupling or magnetically driving components of a magnetically driven pump rotor, and
an electronic controller comprising or connected to a motion sensor, the motion sensor configured to detect movement of the pump drive, the movement comprising a rotation of the entire pump drive, wherein the electronic controller is configured to determine an orientation of the pump drive; and
at least one pump section comprising the magnetically driven pump rotor, wherein:
the induction charging station is configured to inductively charge the rechargeable voltage source or rechargeable battery of the pump drive and comprises a controller operable to detect a placement of the pump drive on the induction charging station, and
the electronic controller is configured to activate the magnetic section of the pump drive to transfer the pump drive from a first state to a second state in response to determining that the pump drive is in a first orientation, wherein the magnetic section is configured to magnetically couple or magnetically drive the components of the magnetically driven pump rotor when the magnetic section is activated in the second state, and wherein the electronic controller is configured to deactivate the magnetic section of the pump drive to transfer the pump drive from the second state to the first state in response to determining that the pump drive is in a second orientation, wherein the magnetic section is configured to stop magnetically coupling or magnetically driving the components of the magnetically driven pump rotor when the magnetic section is deactivated in the first state.

20. The medical treatment apparatus according to claim 19, wherein the at least one pump section and the pump drive are in magnetic connection or in gravitational connection.

21. The pump drive according to claim 1, wherein the first state of the pump drive is an inactive state and the second state of the pump drive is an active state in which the magnetic section of the pump drive consumes energy.

\* \* \* \* \*